(12) United States Patent
Petroski

(10) Patent No.: US 10,706,385 B2
(45) Date of Patent: Jul. 7, 2020

(54) ITEM EXCHANGE LOCKER AND STATION

(71) Applicant: Alexander J. Petroski, Akron, OH (US)

(72) Inventor: Alexander J. Petroski, Akron, OH (US)

( * ) Notice: Subject to any disclaimer, the term of this patent is extended or adjusted under 35 U.S.C. 154(b) by 0 days.

(21) Appl. No.: 16/004,729

(22) Filed: Jun. 11, 2018

(65) Prior Publication Data

US 2019/0213540 A1 Jul. 11, 2019

Related U.S. Application Data

(63) Continuation of application No. 15/865,460, filed on Jan. 9, 2018.

(51) Int. Cl.
*G06Q 10/08* (2012.01)
*G07F 7/12* (2006.01)

(52) U.S. Cl.
CPC ..... *G06Q 10/0836* (2013.01); *G06Q 10/0837* (2013.01); *G07F 7/12* (2013.01)

(58) Field of Classification Search
CPC ... G06Q 10/0836; G06Q 10/0837; G07F 7/12
See application file for complete search history.

(56) References Cited

U.S. PATENT DOCUMENTS

| 2002/0016726 | A1 | 2/2002 | Ross |
| 2002/0156645 | A1 | 10/2002 | Hansen |
| 2002/0178016 | A1 | 11/2002 | McLellan |
| 2003/0040980 | A1 | 2/2003 | Nakajima et al. |
| 2003/0071543 | A1 | 4/2003 | Daghighian |
| 2004/0015393 | A1 | 1/2004 | Fong et al. |
| 2005/0154602 | A1 | 7/2005 | Hertz |
| 2006/0287870 | A1 | 12/2006 | Mayer et al. |
| 2007/0170237 | A1 | 7/2007 | Neff |
| 2007/0198398 | A1 | 8/2007 | Rios et al. |
| 2008/0251578 | A1* | 10/2008 | Jansing ................ G07F 7/1075 235/379 |

(Continued)

FOREIGN PATENT DOCUMENTS

CN 105788356 A * 7/2016 ............... G08G 1/09

OTHER PUBLICATIONS

Srivatsan Sridharan, Authenticated Secure Bio-metric Based Access to the Bank Safety Lockers, 2014, p. 1-4 (Year: 2014).*

*Primary Examiner* — Kevin H Flynn
*Assistant Examiner* — Ibrahim N El-Bathy
(74) *Attorney, Agent, or Firm* — Renner, Otto, Boisselle & Sklar, LLP

(57) ABSTRACT

An item exchange locker station may include a station-level user interface accessible from outside the station enclosure to receive identifying information of a deliverer or a retriever seeking to enter the station and to transmit the identifying information to an off-site data server for the identifying information to be validated against a database. The station may also include lockers disposed within the station enclosure, the lockers including a locker access door, and a locker locking mechanism configured to alternatively lock and unlock to impede and permit, respectively, opening of the locker access door. The station may also include a locker-level controller configured to receive locker unlocking instructions from the off-site data server upon validation of the identifying information.

20 Claims, 11 Drawing Sheets

(56) References Cited

U.S. PATENT DOCUMENTS

| | | |
|---|---|---|
| 2010/0201536 A1 | 8/2010 | Robertson et al. |
| 2013/0261792 A1* | 10/2013 | Gupta ............... G06Q 10/08 700/232 |
| 2013/0262276 A1 | 10/2013 | Wan et al. |
| 2014/0114875 A1 | 4/2014 | Murthy et al. |
| 2014/0258168 A1 | 9/2014 | Crawford |
| 2014/0330603 A1 | 11/2014 | Corder et al. |
| 2015/0007619 A1 | 1/2015 | Finney et al. |
| 2015/0106291 A1 | 4/2015 | Robinson et al. |
| 2015/0106292 A1 | 4/2015 | Robinson et al. |
| 2015/0106293 A1 | 4/2015 | Robinson et al. |
| 2015/0106295 A1 | 4/2015 | Robinson et al. |
| 2015/0112887 A1 | 4/2015 | Camp |
| 2015/0120601 A1 | 4/2015 | Fee |
| 2015/0120602 A1 | 4/2015 | Huffman et al. |
| 2015/0120603 A1 | 4/2015 | Walker |
| 2015/0178677 A1 | 6/2015 | Strand et al. |
| 2015/0186840 A1 | 7/2015 | Torres et al. |
| 2015/0193732 A1 | 7/2015 | Bouzit-Benbernou |
| 2015/0193733 A1 | 7/2015 | Bouzit-Benbernou |
| 2015/0227882 A1 | 8/2015 | Bhatt |
| 2015/0235173 A1 | 8/2015 | Hall et al. |
| 2015/0235174 A1 | 8/2015 | Hall et al. |
| 2015/0235175 A1 | 8/2015 | Hall et al. |
| 2015/0302351 A1 | 10/2015 | Cassady et al. |
| 2015/0371187 A1 | 12/2015 | Irwin et al. |
| 2015/0379464 A1 | 12/2015 | Turner et al. |
| 2016/0098678 A1 | 4/2016 | Levy |
| 2016/0155088 A1 | 6/2016 | Pylappan et al. |
| 2016/0171435 A1 | 6/2016 | Newton et al. |
| 2016/0292636 A1 | 10/2016 | Moody et al. |
| 2016/0335595 A1* | 11/2016 | Levy ............... G06Q 10/0836 |
| 2016/0350830 A1 | 12/2016 | Youssef |
| 2017/0140183 A1 | 5/2017 | Rinehart et al. |
| 2019/0034859 A1* | 1/2019 | Kim ................. G07C 9/00571 |

\* cited by examiner

ITEM EXCHANGE LOCKER AND STATION

BACKGROUND

In the era of online purchasing sites such as eBay® and Craigslist®, the process of exchanging items such as packages and other transportable goods from one person to another has become a topic of significant attention. In particular, enhancing safety and security in the exchanging process is highly desirable.

Those involved in exchanging an item may commonly include senders, receivers, and delivery personnel such as for example the U.S. Postal Service®. Receivers are people who are intended to receive the item. Often times the receiver is a person who purchased the item. The sender may be a manufacturer, vendor, seller, or distributor of the item, for example. In response to the purchase of an item in, for example, Craigslist® the sender may enlist the services of delivery personnel (e.g., couriers, shippers, postal service) if the item is to be shipped to a relatively distant location. For more local transactions, however, senders or receivers may also function as the delivery personnel, delivering or picking up the item themselves for the other person's location or from a neutral site. This sometimes raises issues of safety and security.

Although unattended delivery and retrieval systems have been devised, safety and security in the exchanging process has been a challenge. Security personnel may help enhance security but may also increase the cost of the transactions. Curtailing time availability of delivery and retrieval systems to daylight hours may also help enhance security but may make it inconvenient for users. Locating delivery and retrieval systems within busy locations such as gas stations, bus stations, train stations, convenience stores, etc. may also enhance security but may limit access and availability.

Therefore, there is a need in the field for improvements to the item exchange process to make it more safe and secure while making it also convenient, widely available, and cost-effective.

SUMMARY OF THE INVENTION

The present disclosure provides an item exchange locker station that provides safety and security during item exchanges while making it also convenient, widely available, and cost-effective.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1A:
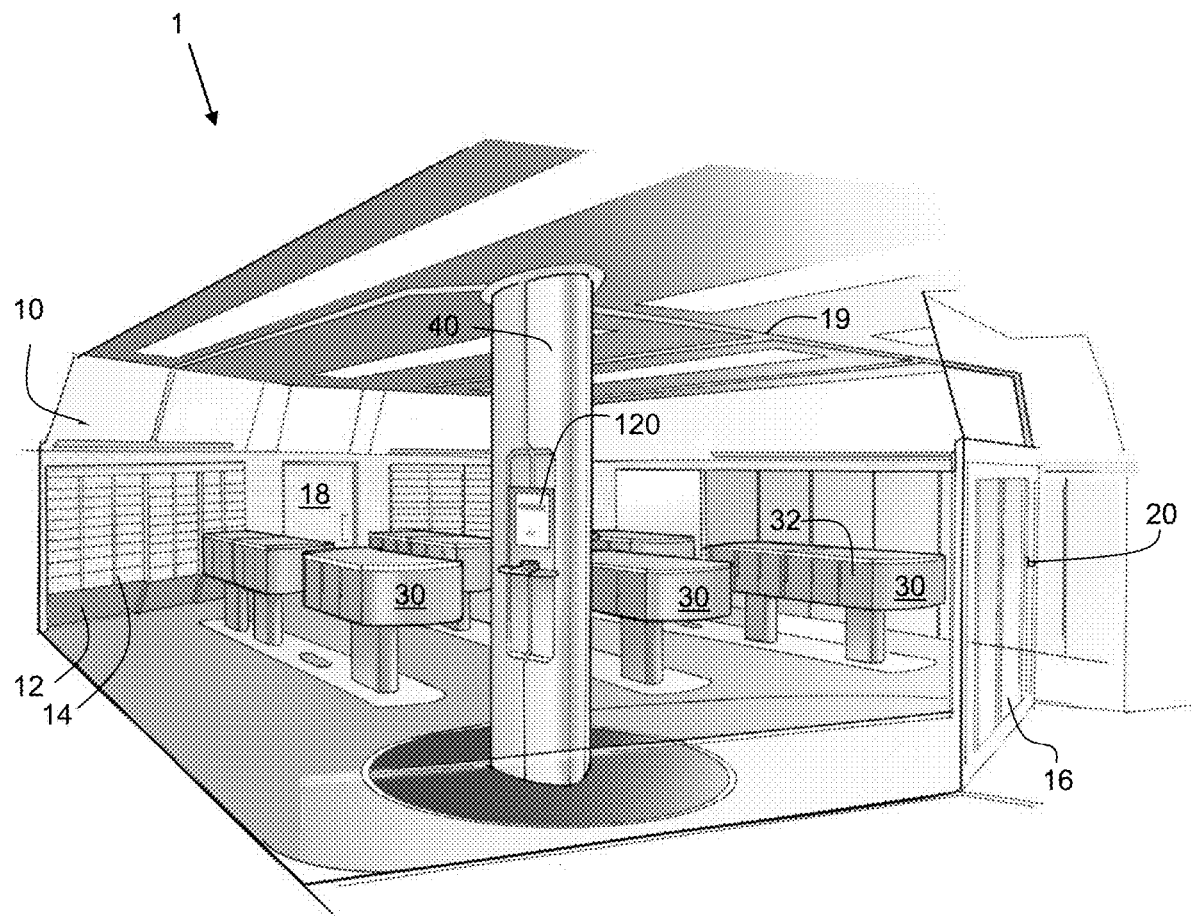
FIG. 1A illustrates a perspective view of an exemplary item exchange locker station.
Figure 1B:
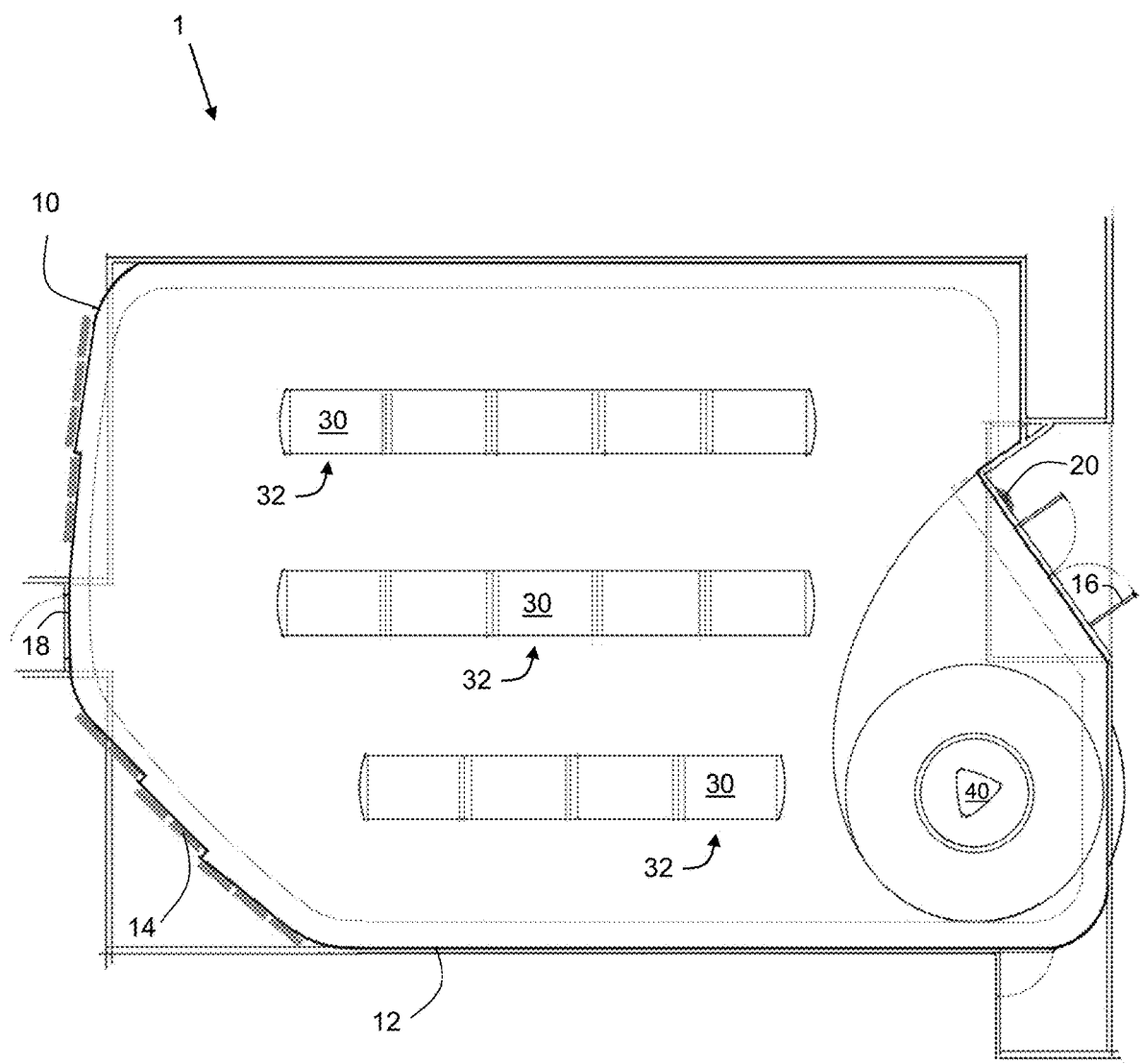
FIG. 1B illustrates a plan view of the exemplary item exchange locker station.
Figure 1C:
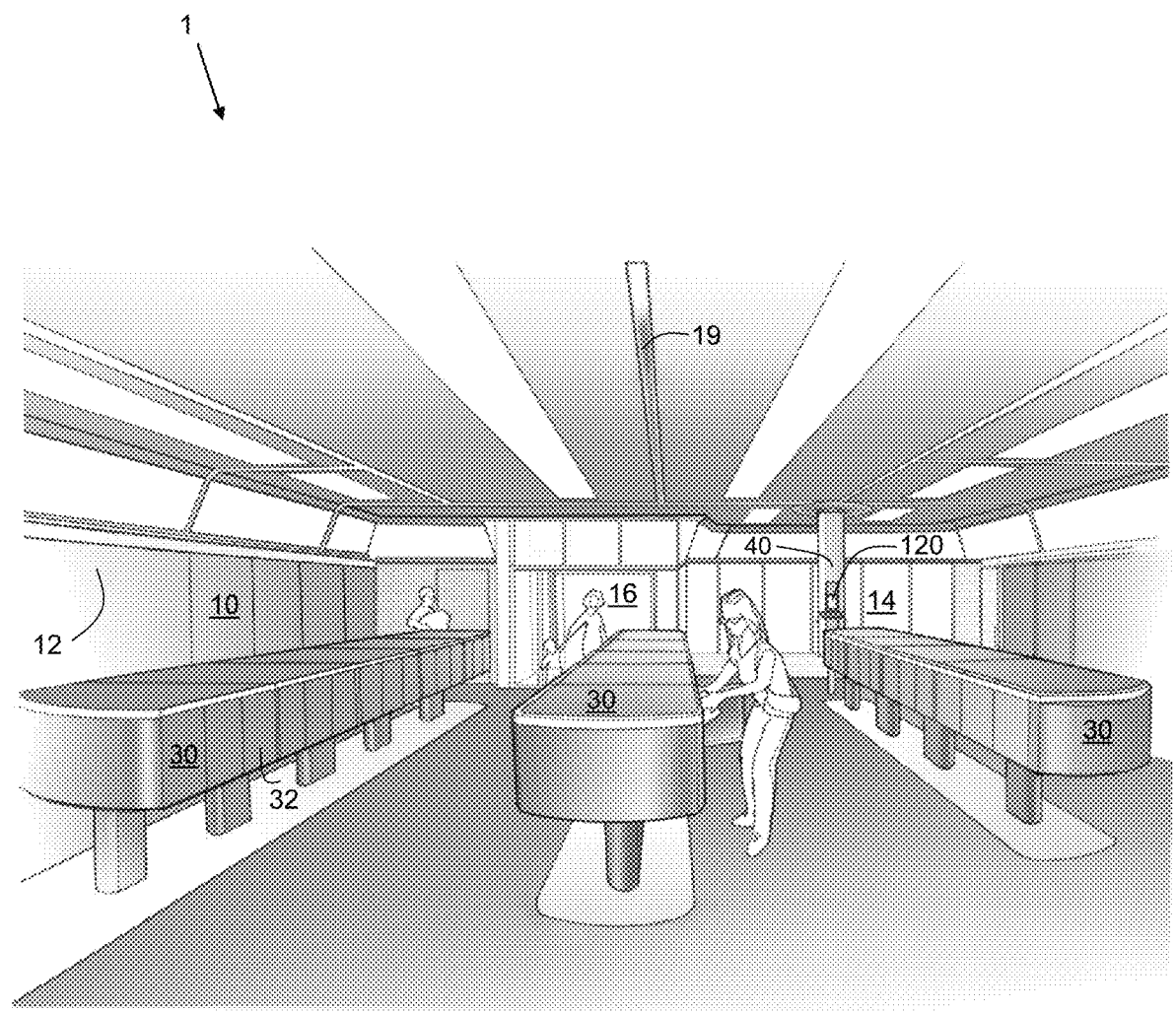
FIG. 1C illustrates a perspective view inside the exemplary item exchange locker station.

FIGS. 1A-1C illustrate various views of an exemplary item exchange locker station 1. The station 1 includes a station enclosure 10 including, for example, walls 12, windows 14, and a station entry door 16. The station enclosure 10 may also include an emergency exit 18.

The door 16 alternatively opens and closes to permit and impede entry to the station enclosure 10. The station 1 may also include a main lock or station locking mechanism to alternatively lock and unlock to impede and permit opening of the station entry door 16. The station 1 may also include a station-level user interface 20 accessible from outside the station enclosure 10. As described in detail below, the station-level user interface 20 receives identifying information of a person (i.e., a deliverer or a retriever) seeking to enter the station enclosure 10 for the information to be transmitted to an off-site location to be validated. Upon validation of the identifying information, station unlocking instructions may be received from the off-site location for the station locking mechanism to unlock to permit opening of the station entry door 16 upon receipt of the station unlocking instructions.

The station 1 may also include lockers 30. Upon validation of the identifying information and receiving the station unlocking instructions, a lighted path 19 on the floor or (as shown in the illustrated embodiment of FIGS. 1A and 1C) on the ceiling of the station enclosure 10 may be used to indicate to a user the particular locker 30 assigned to the user. The lighted path 19 may indicate the path from the station-level user interface 20, a locker-level user interface 120, or from the station entry door 16 to the assigned locker 30.

The lockers 30 may include a locker access door 32 that alternatively opens and closes to permit and impede access to the locker's interior. The lockers 30 may also include a locker lock or locker locking mechanism to alternatively lock and unlock to impede and permit opening of the locker access door 32.

In one embodiment, a locker 30 may include a locker-level user interface that receives identifying information of the deliverer or retriever seeking to access the locker 30. In the illustrated embodiment, the station 1 includes at least one locker-level user interface 120 at a location other than at a locker 30 such as, for example, a welcome kiosk 40.

The locker-level user interface 120 receives the identifying information of the deliverer or retriever seeking to access the locker 30 so that the information may be transmitted to an off-site location to be validated. Upon validation of the identifying information, locker unlocking instructions may be received from the off-site location for the locker locking mechanism to unlock to permit opening of the locker access door 32.

This way, the deliverer or retriever may gain access to the station enclosure 10 and a locker 30.

Figure 2:
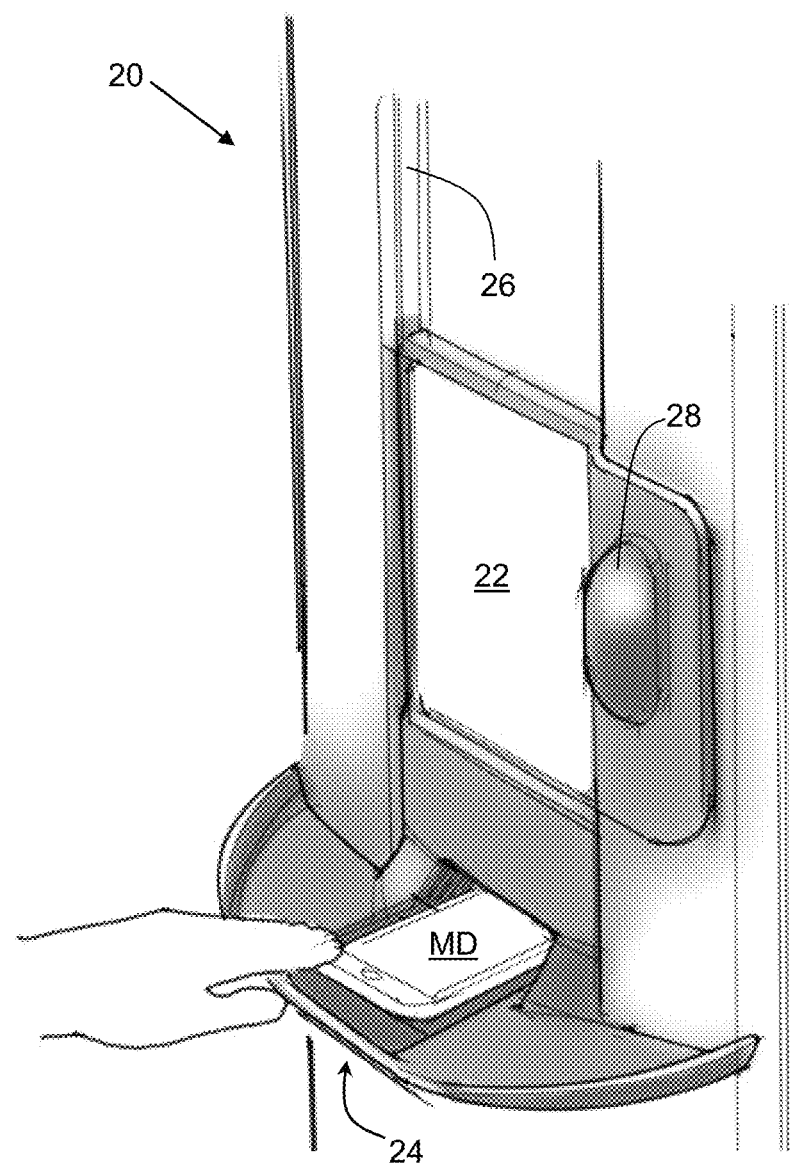
FIG. 2 illustrates a perspective view of an exemplary user interface for the item exchange locker station.

FIG. 2 illustrates a perspective view of an exemplary user interface 20. For brevity of explanation, a station-level user interface 20 is used here to describe the features of a user interface. This description, however, is similarly applicable to a locker-level user interface 120, which, although not necessarily identical, may share many features with the station-level user interface 20.

The station-level user interface 20 may include a display 22 that may welcome the user and provide instructions. As described below, an off-site or system server may assign each user identifying information (i.e., credentials) such as, for example, a unique Swap ID, which may have a corresponding account QR code. The server may also store the relationships between users and their credentials for later used in approving or denying user's access to a station 1 or locker 30. The server may further make the credentials available to the user for display on a screen of a mobile device MD (e.g., mobile phone) to use as a "key" to gain access to the station 1 or a locker 30. The station-level user interface 20 may also include a dock 24 into which a user may insert the mobile device MD. The dock 24 may include a scanner to scan the credentials (e.g., QR code) from the screen of the mobile device MD. In addition or alternatively, the station-level user interface 20 may include a keypad by which the user may enter credentials such as a Swap ID, etc.

The station-level user interface 20 receives the identifying information of the user (i.e., a deliverer or a retriever) seeking to enter the station enclosure 10 and the information is transmitted to an off-site location to be validated. Upon validation of the identifying information, station unlocking instructions are received from the off-site location for the station locking mechanism to unlock to permit opening of the station entry door 16. Similarly, the locker-level user interface receives the identifying information of the user (i.e., a deliverer or a retriever) seeking to access a corresponding locker 30 and the information is transmitted to an off-site location to be validated. Upon validation of the identifying information, locker unlocking instructions are received from the off-site location for the locker locking mechanism to unlock to permit access to the locker 30.

In one embodiment, the user interface 20 includes vertical rails 26 and a handle 28 such that a height or vertical position of the user interface 20 including the display 22 and the dock 24 may be adjusted for user's convenience.

Figure 3:
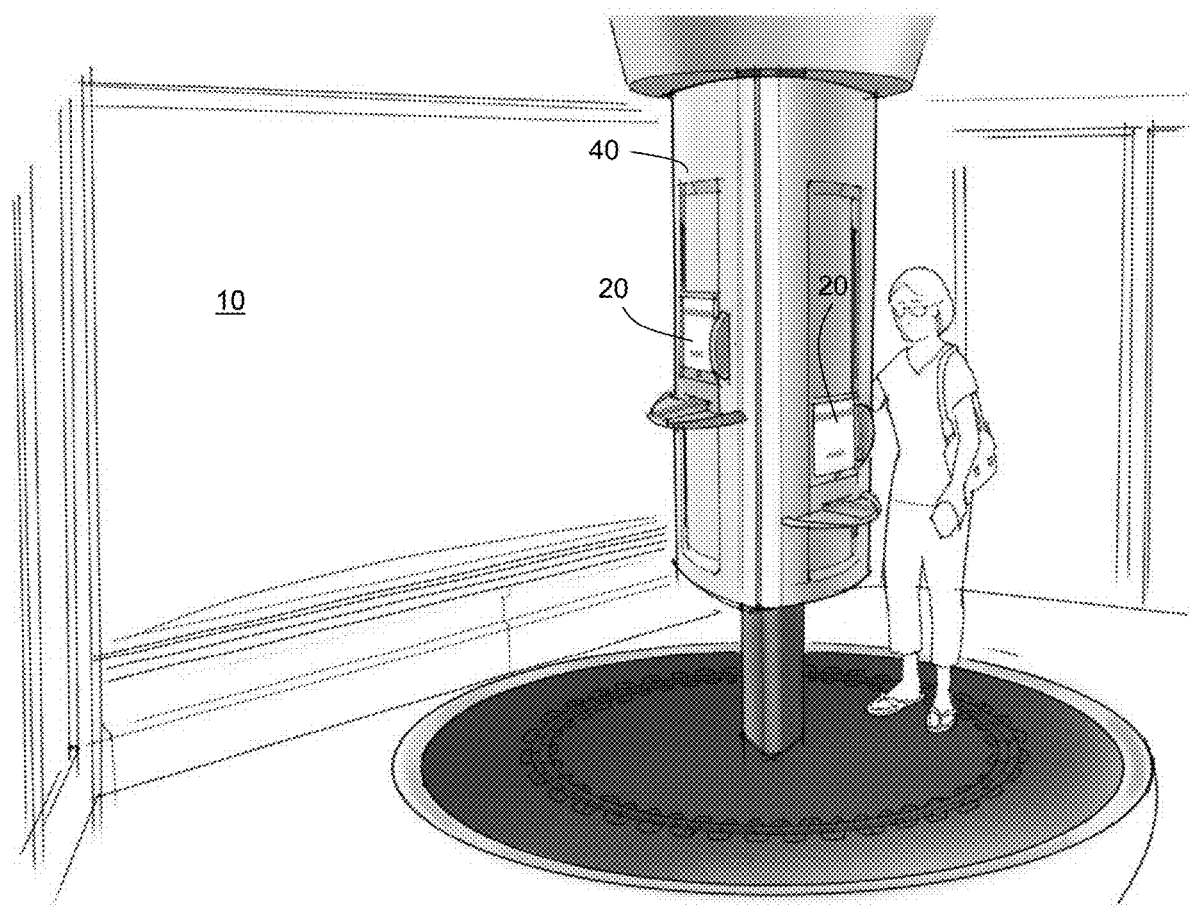
FIG. 3 illustrates a perspective view of an exemplary user interface kiosk for the item exchange locker station.

FIG. 3 illustrates a perspective view of an exemplary user interface kiosk 40. The kiosk 40 may include one or more user interfaces 20. The kiosk 40 may be used in at least two contexts.

First, the kiosk 40 may be used to include one or more station-level user interfaces 20. This may be desirable in, for example, a station 1 with very high traffic volume. In such a high traffic station, multiple station-level user interfaces 20 may be desirable and the kiosk 40 may be a way to provide such multiple station-level user interfaces 20 in a convenient and efficient package. A kiosk 40 may also be desirable in a station 1 located in very cold temperature areas where having a station-level user interface 20 exposed to the elements may be uncomfortable for the user. In such cases, the station 1 may include a temperature-controlled lobby area outside the station enclosure 10 in which the kiosk 40 including multiple station-level user interfaces 20 may be located for the user to enter identifying information to gain access to the main station enclosure 10.

Second, the kiosk 40 may be used to include one or more locker-level user interfaces 120. This may be desirable to provide users with a welcoming lobby area inside the station enclosure 10 in which the kiosk 40 with multiple locker-level user interfaces 120 may be located for the user to enter identifying information to gain access to a specific locker 30. This solution may be more cost-effective than providing a dedicated user interface 120 for each locker 30.

Figure 4:
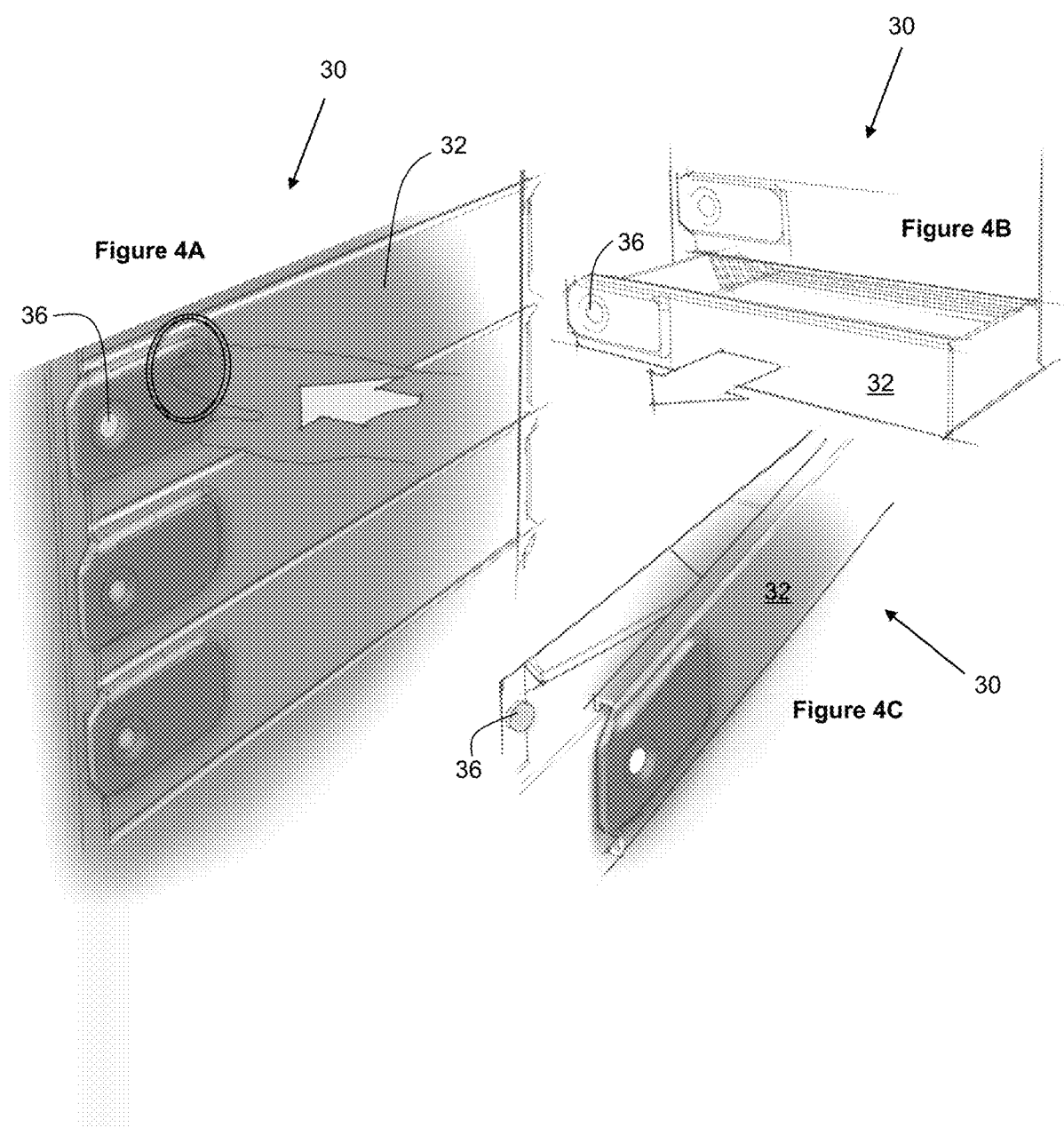
FIG. 4A-4C illustrate exemplary lockers for the item exchange locker station.

FIG. 4A-4C illustrate exemplary lockers 30. As described above, a locker 30 may include a locker access door 32 that alternatively opens and closes to permit and impede access to the locker's interior. A locker 30 may also include a locker lock or locker locking mechanism to alternatively lock and unlock to impede and permit opening of the locker access door 32. In some embodiments, at least some of the lockers 30 may include a locker-level user interface that receives identifying information of the deliverer or retriever seeking to access the locker 30.

A locker 30 may also include a local indicator 36 such an LED light to, for example, indicate to a user a locker specifically assigned to that user. For example, upon validation of the identifying information at the station level and receiving the station unlocking instructions, the indicator 36 may be made to blink to indicate to a user the particular locker 30 assigned to the user. The indicator 36 may instead or in addition be used to indicate whether a locker is locked (e.g., red) or unlocked (e.g., green). The indicator 36 light may be visible from an area inside the station enclosure 10 adjacent the entry door 16 or the kiosk 40 and the light 36 lights up upon receipt of the station unlocking instructions so that the light 36 identifies a specific locker 30 to which the deliverer is to deliver or from which the retriever is to retrieve. As shown in FIG. 4A, in one embodiment, a user may press on an unlocked locker door 32 to open the door. The user may similarly press on the locker door 32 to close the door. As shown in FIGS. 4B and 4C locker doors 32 may be slide-out doors (4B) or hinged doors (4C).

Figure 5:
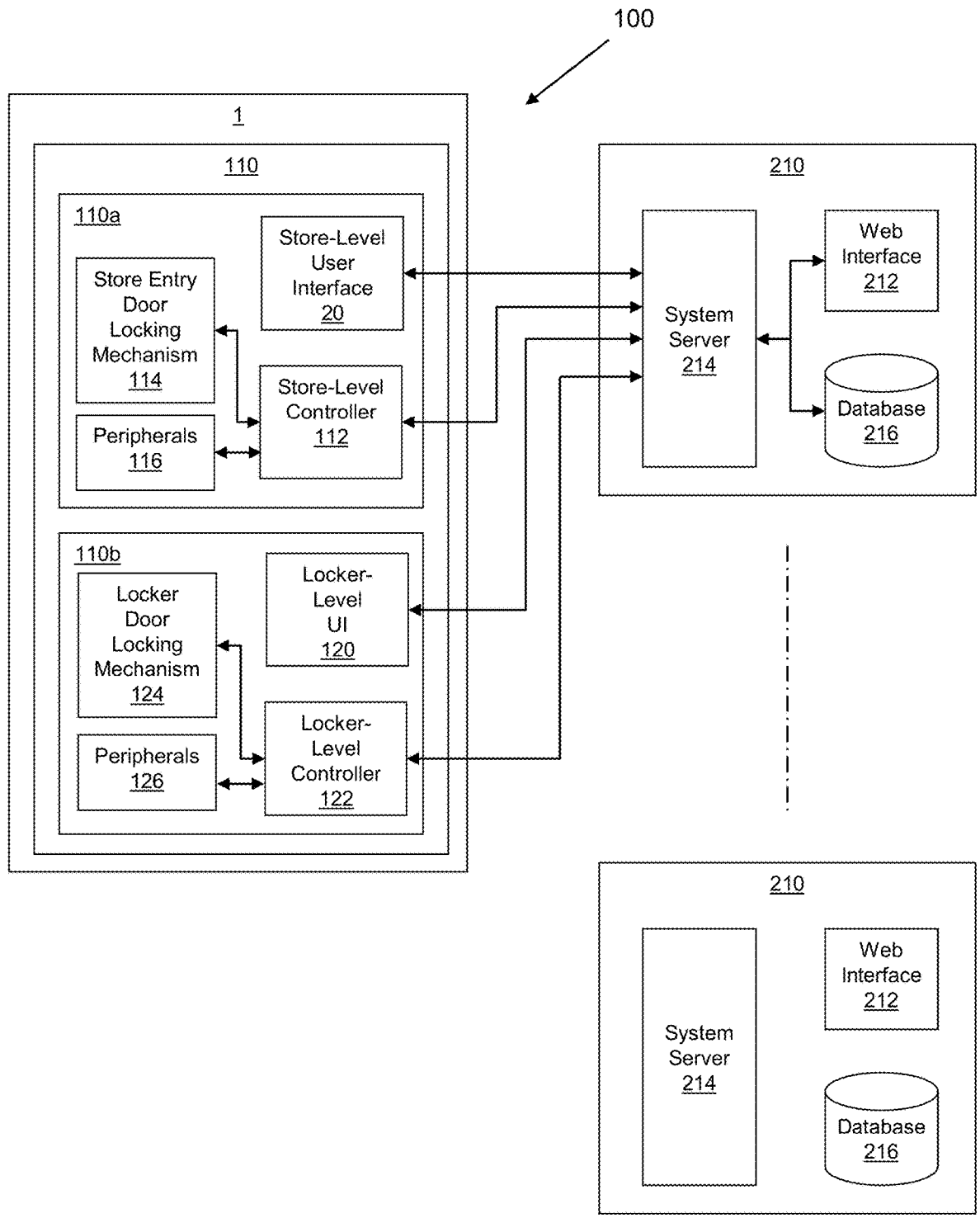
FIG. 5 illustrates a block diagram of an exemplary system for the operation of the item exchange locker station.

FIG. 5 illustrates a block diagram of an exemplary system 100 for the operation of the station 1. The system 100 may include at least two main portions: a local or station portion 110 and a remote or cloud portion 210. This architecture is scalable and, therefore, many station portions 110 may interface with a cloud portion 210 and many cloud portions 210 may coexist within a system 100.

The cloud portion 210 may include a web interface 212, a system or off-site server 214, and a system database 216. The station portion 110 may include two sub-systems: a station-level subsystem 110a and a locker-level subsystem 110b. The station-level subsystem 110a may include the station-level user interface 20, a station-level controller 112, and the entry door locking mechanism 114. The station-level subsystem 110a may also include additional peripherals 116 such as, for example, the path lights 19. The locker-level subsystem 110b may include the locker-level user interface 120, a locker-level controller 122, and the locker door locking mechanism 124. The locker-level subsystem 110b may also include additional peripherals 126 such as, for example, the local indicator 36.

Figure 6:
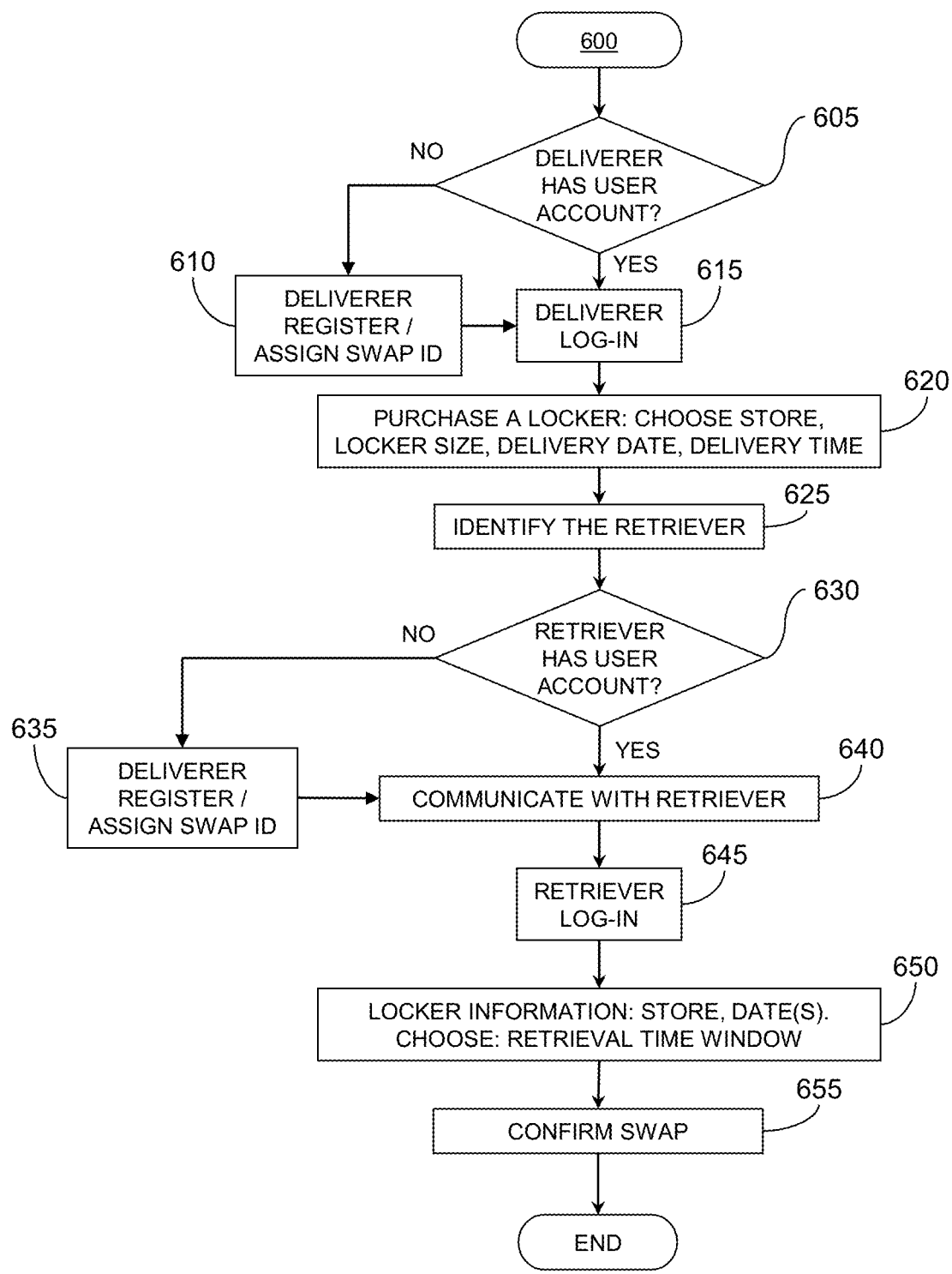
FIG. 6 illustrates a flow diagram for an exemplary method for operating the item exchange locker station, in particular for purchasing a locker and scheduling an exchange.

FIG. 6 illustrates a flow diagram for an exemplary method 600 for operating the item exchange locker station 1, in particular for purchasing a locker and scheduling an exchange.

At 605, users may interact with the web interface 212 to register (at 610) or log in (at 615) to place locker orders. A user, for example a user seeking to deliver an item sold on Craigslist® to another user may use the web interface 212 to open an account and order a locker to exchange the item safely. Users may, for example, use integrated single sign-on services (available from Facebook®, Google®, and other providers) for account registration and login validation for accessing users' accounts. During registration, the system server 214 may assign each user a unique Swap ID, which may have a corresponding account QR code. The server 214 may store the relationships between users, Swap ID, and QR codes in the system database 216.

In one embodiment, both a Swap ID and the corresponding QR code may be permanently assigned to a single customer to act as identifier and validation key for that user in the system 100. The QR code may serve as the primary, scannable user identifier while the Swap ID may be used as a redundancy in the unlikely event there is an error with scanning equipment on-site at the station 1 or in the event that a user (deliverer or retriever) is unable to present their QR code at the time they wish to access the station 1 or a locker 30. The server 214 may assign a user a Swap ID and QR code and send this information to the user via text message or email. The Swap ID and QR code may also be available to users by logging in to their accounts online. Swap ID and QR codes may be permanently associated with user's accounts and, thus, may be reused for transactions associated with those accounts, regardless of their role (deliverer or retriever) in any specific transaction.

Swap ID or QR codes may also serve as identifiers and be associated with flags for users to receive personalized conditions which will be applied to that customer's current or subsequent transactions. These flags may automatically adjust the user experience whenever the specific Swap ID or QR code is utilized. Examples include: customizing the user's experience to comply with ADA-Compliance requests, offering discounted rate structures for specified individuals, allowing remote suspension/reinstatement of services for a particular user's account, etc.

At 620, once the deliverer logs in to the web interface 212, the deliverer may purchase a locker 30 to exchange the item. In one embodiment, the web interface may present the deliverer the option to choose from a number of different locker sizes, dates available to deliver the item, specific time windows on the chosen delivery date, and a particular station 1 (from perhaps many available station locations) the deliverer prefers to complete the item exchange.

At 625, the web interface 212 may also ask the deliverer for valid contact information (e.g., email address, cell phone number, etc.) of the retriever (the user who would retrieve the item from the chosen locker 30). At 630, if the entered retriever contact information is already associated with a valid account, the retrieving portion of the locker purchase may be assigned to that account and the corresponding Swap ID. If the entered retriever contact information is not already associated with a valid account, at 635, the system server 214 may assign a Swap ID, which may have a corresponding account QR code, and, at 640, communicate (e.g., email, text, voice message, etc.) with the retriever using the contact information requesting the retriever to complete creation of an account or log-in. At 645, the retriever may log-in. As do the deliverers, the retrievers may, for example, use integrated single sign-on services (available from Facebook®, Google®, and other providers) for account registration and log-in. The server 214 may store the relationships between users, Swap ID, and QR codes in the system database 216.

At 650, once the retriever has logged in, the web interface 216 may provide the retriever information such as dates available to retrieve the item, time windows available on the chosen retrieval date, and the particular station 1 from which to retrieve the item. The retriever may choose from the dates available to retrieve the item and the time windows available on the chosen retrieval date. At 655, once the retriever has made selections, the exchange may be confirmed and confirmation communication (e.g., email, text message, voice message, etc.) may be sent out to deliverer and retriever confirming. The deliverer's communication may include the specific delivery details (date, time window, location, locker size, etc.) including, in one embodiment, identification of a specific locker 30 at the station 1 to be used for the exchange.

Figure 7:
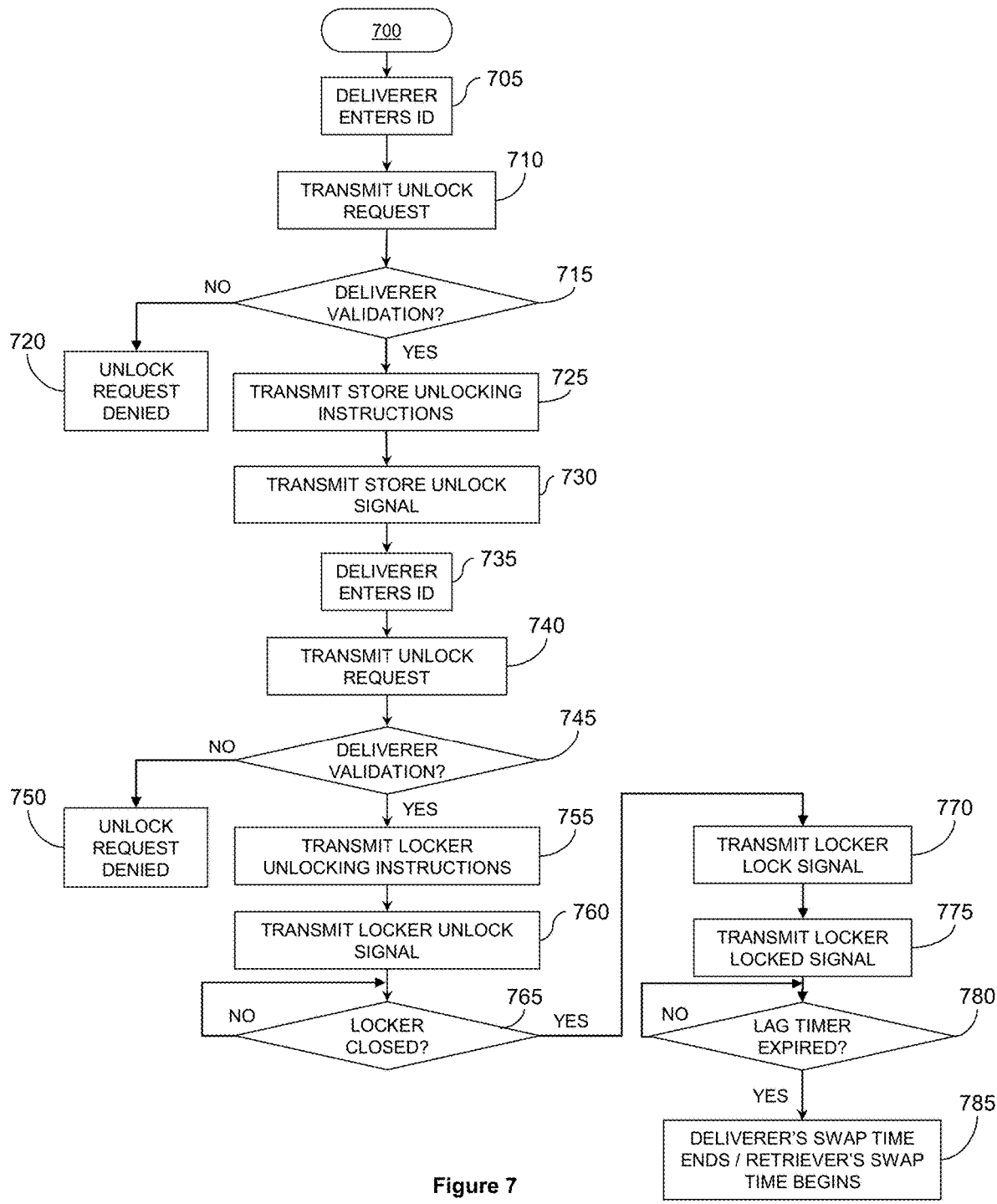
FIG. 7 illustrates a flow diagram for an exemplary method for operating the item exchange locker station, in particular for performance of an item exchange for the delivery of a given item.

FIG. 7 illustrates a flow diagram for an exemplary method 700 for operating the item exchange locker station 1, in particular for performance of an exchange: delivery.

Deliverers may access only the specific chosen station 1 and only a specific locker 30. The locker 30 may be assigned during the registration process or upon the deliverer arriving at the station 1. Moreover, access is only available during the exchange date(s) and time window specified during the purchasing process. Upon delivery or upon expiration of the time window, deliverer access is revoked. A station 1 may be generally available 24 hours a day 7 days a week but its door 16 remains locked and is only unlockable by presenting a valid Swap ID during a valid exchange time. When a deliverer's exchange time begins the system server 214 may activate the deliverer's Swap ID and/or QR code to grant the deliverer access to the station 1 and/or locker 30. The server 214 may also send the deliverer a communication (e.g., email, text message, voice message, etc.) that their exchange time has begun.

Once the exchange time has begun, at 705, the deliverer may scan their QR code or input their Swap ID by scanning their mobile device's screen using the dock 24 at the station-level user interface 20. In one embodiment, scanning of the QR code or inputting of the Swap ID at the station-level user interface 20 does not, by itself, unlock the door 16. In fact, notice that in the exemplary system of FIG. 5 there is no data connection between the user interface 20 and the controller 112 that controls the locking mechanism 114. The user interface 20 is effectively incapable of generating or pushing any unlock signals to any doors including the station door 16 or locker doors 32. Instead, scanning of the QR code or inputting of the Swap ID at the station-level user interface 20, at 710, transmits unlock requests including identifying information to the off-site system server 214 for the identifying information to be remotely validated against the database 216. At 715, validation includes, not only verifying the identity of the deliverer, but also verifying the appropriate station 1, exchange time, etc.

In one embodiment, the system server 214 logs received unlock requests together with the identifying information, mobile device id (e.g., UDID, IDFA, IDFV, WAID, AAID, etc.) date, time, station id, etc. in database 216.

At 720, in the case that validation fails, the system server 214 transmits an unlock request denial to the user interface 20.

At 725, upon validation of the identifying information, the system server 214 transmits station unlocking instructions to the station-level controller 112 and, in one embodiment, an unlock request approval message to the user interface 20 to be displayed to the user. Upon receipt of the station unlocking instructions, at 730, the station-level controller 112 may transmit an unlock signal to the station locking mechanism 114 to unlock to permit opening of the station entry door 16.

In one embodiment, scanning of the QR code or inputting of the Swap ID at the station-level user interface 20 generates a "wake" signal that may be transmitted (e.g., to the system server 214 to be transmitted to the controller 112 or another appropriate control) for the interior lights at the station 1 to turn on, if necessary, as well for security features such as security camera recording, etc. to commence or at least time stamp.

In one embodiment, upon validation of the identifying information and receiving the station unlocking instructions, a lighted path 19 on the floor or (as shown in the illustrated embodiment of FIGS. 1A and 1C) on the ceiling of the station enclosure 10 may be used to indicate to a user the particular locker 30 assigned to the user. The lighted path 19 may indicate the path from the station-level user interface 20, a locker-level user interface 120, or from the station entry door 16 to the assigned locker 30. Therefore, the station 1 may include one or more light paths 19 disposed on the floor or the ceiling of the station to light up upon receipt of station unlocking instructions for the light path to guide the deliverer or retriever from the entry door 16 or from a welcoming kiosk 40 to a specific locker 30 to which the deliverer is to deliver or from which the retriever is to retrieve.

Unlocking of the door 16, however, does not unlock any lockers 30 inside of the station 1. Once inside the station enclosure 10, at 735, the deliverer may scan their QR code or input their Swap ID a second time by using the dock 24 at the locker-level user interface 120.

In one embodiment, scanning of the QR code or inputting of the Swap ID at the locker-level user interface 120 does not, by itself, unlock the locker door 32. The user interface 120 may be effectively incapable of generating or pushing any unlock signals to any doors including the station door 16 or locker doors 32. Instead, at 740, scanning of the QR code or inputting of the Swap ID at the locker-level user interface 120 causes it to transmit an unlock request including identifying information to the off-site system server 214 for the identifying information to be validated against the database 216. At 745, validation includes, not only verifying the identity of the deliverer, but also verifying the appropriate locker 30, exchange time, etc.

At 750, in the case that validation fails, the system server 214 transmit a denial of access to the locker-level user interface 120.

At 755, upon validation of the identifying information, the system server 214 transmits locker unlocking instructions to the locker-level controller 122 and, in one embodiment, an unlocking verification message to the user interface 120 to be displayed to the user. Upon receipt of the station unlocking instructions, at 760, the locker-level controller 122 may transmit an unlock signal to the locker locking mechanism 124 to unlock to permit opening of the locker door 32. As described above, once the locker door 32 is unlocked the deliverer may open by pressing on it or other means. Once the door 32 is open, the deliverer may leave the item inside the locker 30 and close the door.

The locker 30 may also include a door sensor that senses whether the door 32 is open or closed and transmit the information to the locker-level controller 122 and, in one embodiment, to the system server 214. Once the locker-level controller 122 transmits the unlock signal and, subsequently, at 765, detects via the sensor that the locker door 32 has been opened and then closed, the locker-level controller 122, at 770, may transmit a lock signal to the locker locking mechanism 124 to lock the locker door 32. The locker-level controller 122, at 775, may then transmit a locked signal to the system server 214 indicating that the locker door 32 is now locked.

In one embodiment, upon issuance of the locked signal (verifying that the locker door 32 has been closed and locked), the locker-level controller 122 or, in one embodiment, the system server 214 commences a "deliverer's grace period" of, for example, 15 minutes. During this period, the deliverer may re-scan their QR code or input their Swap ID as described above to unlock the station door 16 or the locker door 32 to gain access to the station enclosure 10 as well as to the specific locker 30. The grace period may be provided in case the deliverer changes her mind or has any other issue that necessitates access to the locker 30 after the first attempt at delivery. Upon expiration of the grace period, the deliverer's access to both the locker 30 and to the station 1 is automatically revoked.

In one embodiment, the station 1 or the station-level locking mechanism 114 may further include a sensor, camera, or other device that detects whether the deliverer has in fact exited the station 1 after the deliverer's last entry into the station 1 and transmits that deliverer exit information to the station-level controller 122 or the system server 214.

Once the deliverer grace period expires and/or the system server 214 receives the deliverer exit information, at 780, the system server 214 commences a lag timer period of, for example, 25 minutes. During this lag timer, neither the deliverer nor the retriever may access the station 1. The lag timer may be provided to promote the safety and security of the deliverer and the retriever by preventing them from crossing paths inside the station 1 and allowing the deliverer adequate time to leave the station 1 before the retriever is to arrive.

At 785, once the lag timer expires, the deliverer's exchange time ends and the retriever's exchange time begins; the system server 214 may activate the retriever's Swap ID or QR code, granting them access to the station 1 and to the specific locker 30. At this time, only the retriever (and not the deliverer) may access the station 1 and the locker 30. The system server 214 may also notify the retriever via email, text message, voice message, etc. that the item is now available for pick-up at the specific station 1 and the specific locker 30. The retriever may then access the station 1 and locker 30 in a very similar manner as the deliverer did.

Figure 8:
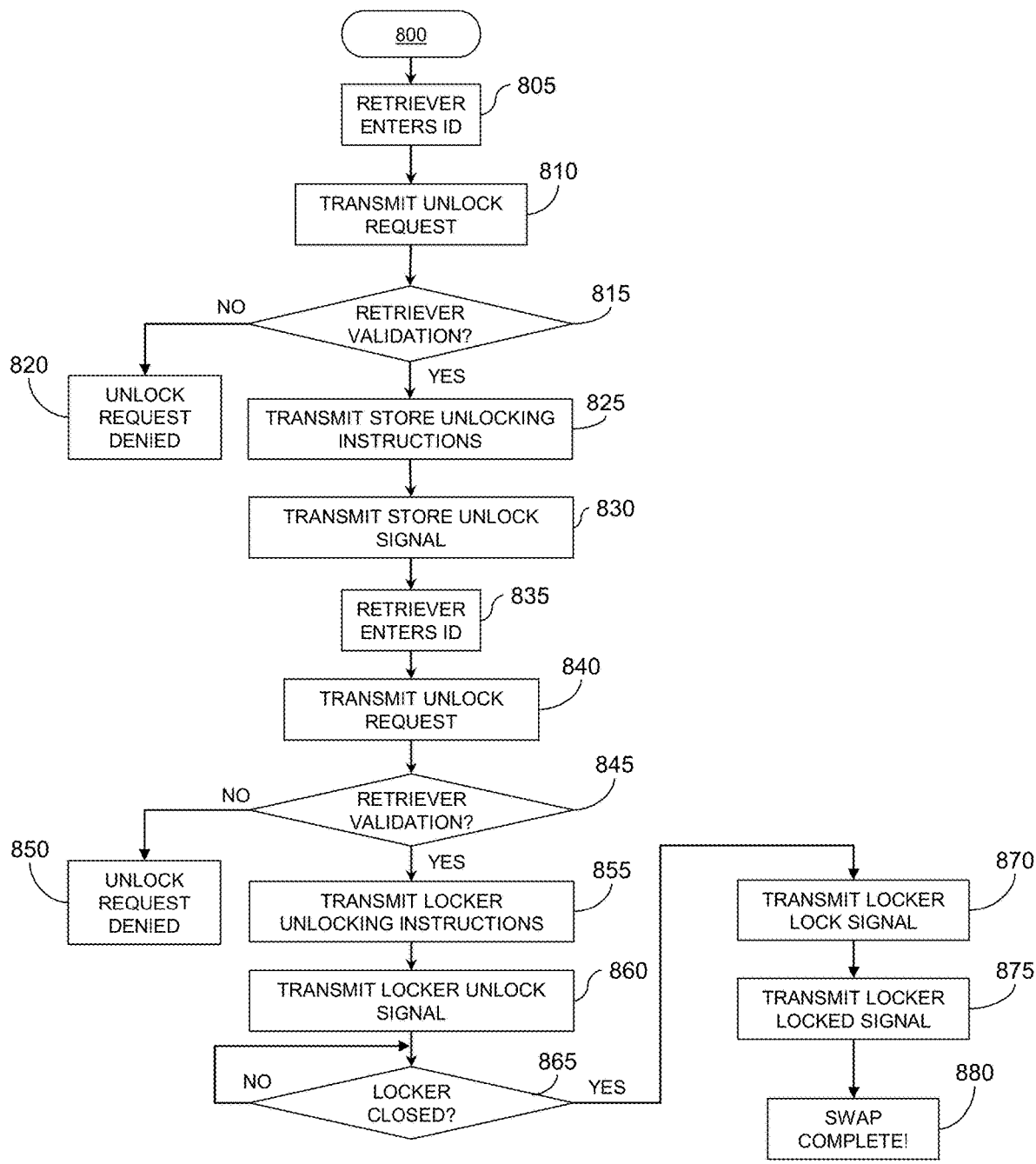
FIG. 8 illustrates a flow diagram for an exemplary method for operating the item exchange locker station, in particular for performance of an item exchange for the retrieval of a given item.

FIG. 8 illustrates a flow diagram for an exemplary method 800 for operating the item exchange locker station 1, in particular for performance of an exchange: retrieval.

When a retriever's exchange time begins, at 805, the retriever may scan their QR code or input their Swap ID by scanning their mobile device's screen using the dock 24 at the station-level user interface 20. In one embodiment, scanning of the QR code or inputting of the Swap ID at the station-level user interface 20 does not, by itself, unlock the door 16. In fact, notice that in the exemplary system of FIG. 5 there is no data connection between the user interface 20 and the controller 112 that controls the locking mechanism 114. The user interface 20 is effectively incapable of generating or pushing any unlock signals to any doors including the station door 16 or locker doors 32. Instead, at 810, scanning of the QR code or inputting of the Swap ID at the station-level user interface 20 transmits an unlock request including identifying information to the off-site system server 214 for the identifying information to be validated against the database 216. At 815, validation includes, not only verifying the identity of the retriever, but also verifying the appropriate station 1, exchange time, etc.

In one embodiment, the system server 214 logs received unlock requests together with the identifying information, mobile device id (e.g., UDID, IDFA, IDFV, WAID, AAID, etc.) date, time, station id, etc. in database 216.

In the case that validation fails, at 820, the system server 214 transmit an unlock request denial to the user interface 20. Upon validation of the identifying information, at 825, the system server 214 transmits station unlocking instructions to the station-level controller 112 and, in one embodiment, an unlock request approval message to the user interface 20 to be displayed to the user. Upon receipt of the station unlocking instructions, at 830, the station-level controller 112 may transmit an unlock signal to the station locking mechanism 114 to unlock to permit opening of the station entry door 16.

In one embodiment, scanning of the QR code or inputting of the Swap ID at the station-level user interface 20 generates a "wake" signal that may be transmitted (e.g., to the system server 214 to be transmitted to the controller 112 or another appropriate control) for the interior lights at the station 1 to turn on, if necessary, as well for security features such as security camera recording, etc. to commence or at least time stamp.

Unlocking of the door 16, however, does not unlock any lockers 30 inside of the station 1. Once inside the station enclosure 10, at 835, the retriever may scan their QR code or input their Swap ID a second time by using the dock 24 at the locker-level user interface 120.

In one embodiment, scanning of the QR code or inputting of the Swap ID at the locker-level user interface 120 does not, by itself, unlock the locker door 32. The user interface 120 may be effectively incapable of generating or pushing any unlock signals to any doors including the station door 16 or locker doors 32. Instead, at 840, scanning of the QR code or inputting of the Swap ID at the locker-level user interface 120 causes it to transmit an unlock request including identifying information to the off-site system server 214 for the identifying information to be validated against the database 216. At 845, validation includes, not only verifying the identity of the retriever, but also verifying the appropriate locker 30, exchange time, etc.

In the case that validation fails, at 850, the system server 214 transmits a denial of access to the locker-level user interface 120. Upon validation of the identifying information, at 855, the system server 214 transmits locker unlocking instructions to the locker-level controller 122 and, in one embodiment, an unlocking verification message to the user interface 120 to be displayed to the user. Upon receipt of the station unlocking instructions, at 860, the locker-level controller 122 may transmit an unlock signal to the locker locking mechanism 124 to unlock to permit opening of the locker door 32. As described above, once the locker door 32 is unlocked the retriever may open by pressing on it or other means. Once the door 32 is open, the retriever may retrieve the item inside the locker 30 and close the door 32.

The locker 30 may also include a door sensor that senses whether the door 32 is open or closed and transmit the information to the locker-level controller 122 and, in one embodiment, to the system server 214. Once the locker-level controller 122 transmits the unlock signal and, at 865, subsequently, detects via the sensor that the locker door 32 has been opened and then closed, at 870, the locker-level controller 122 may transmit a lock signal to the locker locking mechanism 124 to lock the locker door 32. At 875, the locker-level controller 122 may then transmit a locked signal to the system server 214 indicating that the locker door 32 is now locked.

In one embodiment, upon issuance of the locked signal (verifying that the locker door 32 has been closed and locked), the locker-level controller 122 or, in one embodiment, the system server 214 commences a "retriever's grace period" of, for example, 15 minutes. During this period, the retriever may re-scan their QR code or input their Swap ID as described above to unlock the station door 16 or the locker door 32 to gain access to the station enclosure 10 as well as to the specific locker 30. The grace period may be provided in case the retriever changes her mind, forgets something, or has any other issue that necessitates access to the locker 30 after the first attempt at retrieval. Upon expiration of the grace period, the retriever's access to both the locker 30 and to the station 1 is automatically revoked.

In one embodiment, the station 1 or the station-level locking mechanism 114 may further include a sensor, camera, or other device that detects whether the retriever has in fact exited the station 1 after the retriever's last entry into the station 1 and transmits that retriever exit information to the station-level controller 122 or the system server 214.

Once the retriever grace period expires and/or the system server 214 receives the retriever exit information, at 880, the system server 214 closes the transaction, the exchange is complete! The system server 214 may also notify the deliverer and retriever that their transaction has been successfully completed and the locker 30 used for their exchange may be re-listed on the web interface 212 as available for rental.

As stated above, the system server 214 keeps a log of unlock requests in the database 216. This information may be useful in many ways. For example, after a certain number of unlock requests from a given station 1 or a given locker 30, a maintenance request may automatically be pushed to a maintenance technician to inspect the station's door locking mechanism 114 or the locker's locking mechanism 124. In another example, after a certain number of unlock requests from a given station 1, a cleaning request may be automatically pushed to a cleaning crew to attend to cleaning the station 1.

In one embodiment, at least some lockers 30 may include a contraband sensor, which may automatically sense suspicious materials, send a contraband signal to the system server 214, which may, in turn, set a contraband flag to prevent access to the locker 30 in question until the contraband flag has been cleared. The log information (as described above) regarding the specific locker 30 may be available to aid in any subsequent investigation regarding the detected contraband.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 9:
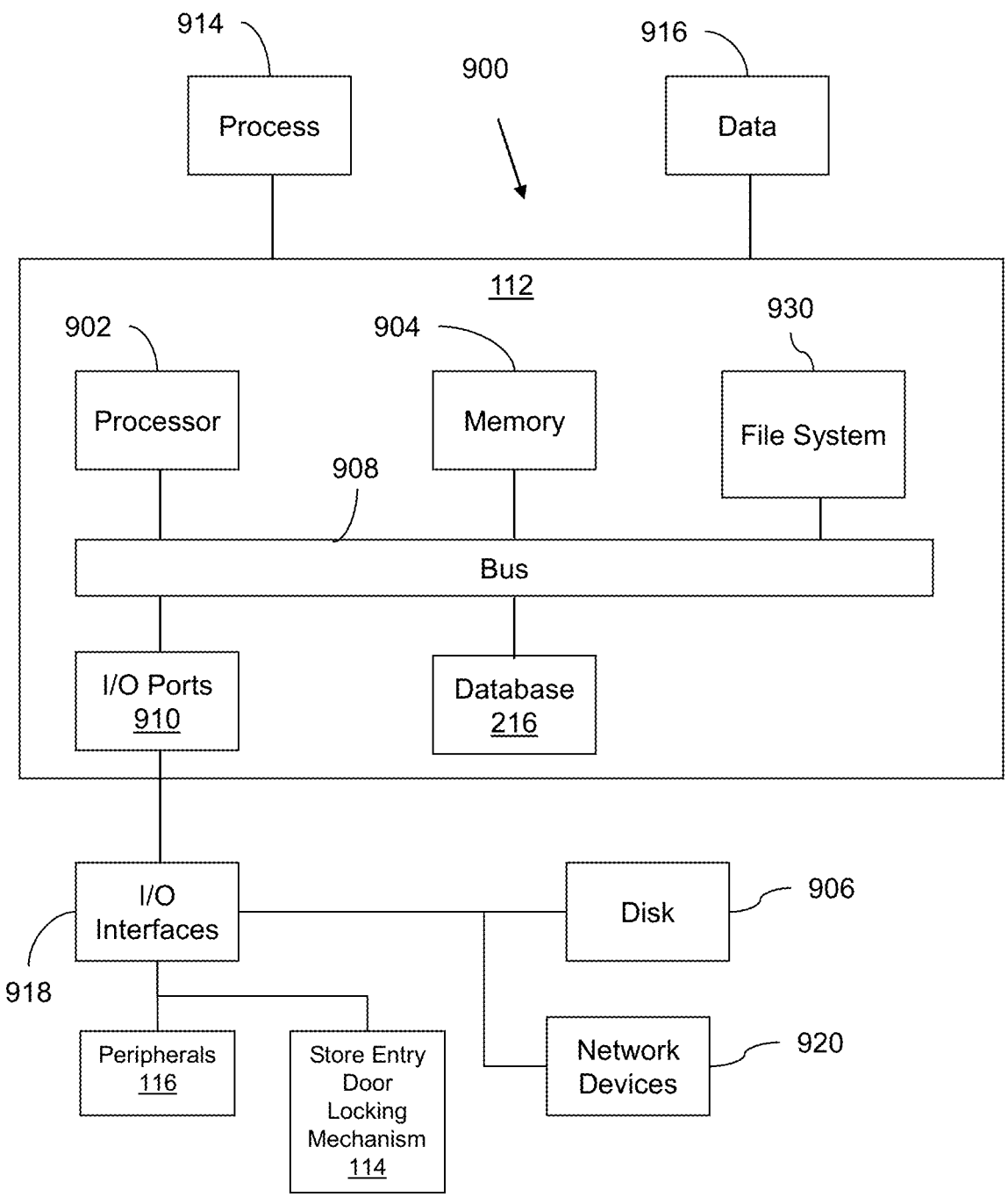
FIG. 9 illustrates a block diagram of an exemplary machine for an item exchange locker station.

FIG. 9 illustrates a block diagram of an exemplary machine 900 for an item exchange locker station 1. In FIG. 9 the machine 900 is disclosed in the context of the station-level subsystem 110a and, more specifically, the station-level controller 112. However, the machine 900 may also be used to deploy the locker-level subsystem 110b and, more specifically, the locker-level controller 122, the station-level user interface 20, the locker-level user interface 120 as well as the remote server 214 and the web interface 212 of the remote portion 210.

The machine 900 may include a processor 902, a memory 904, database 216, and I/O Ports 910 operably connected by a bus 908. In one example, the machine 900 may receive or transmit input or output signals via, for example, I/O Ports 910 or I/O Interfaces 918 from or to, for example, the station entry door locking mechanism 114, the locker door locking mechanism 124, the web interface 212, and the peripherals 116 and 126. Thus, the station-level controller 112, the locker-level controller 122, the station-level user interface 20, the locker-level user interface 120, the remote server 214, and the web interface 212 may be implemented in machine 900 as hardware, firmware, software, or a combination thereof and, thus, the machine 900 and its components may provide means for performing functions described herein as performed the station-level controller 112, the locker-level controller 122, the station-level user interface 20, the locker-level user interface 120, the remote server 214, and the web interface 212.

The processor 902 can be a variety of various processors including dual microprocessor and other multi-processor architectures. The memory 904 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 906 may be operably connected to the machine 900 via, for example, an I/O Interfaces (e.g., card, device) 918 and an I/O Ports 910. The disk 906 can include, but is not limited to, devices like a magnetic disk drive, a solid state disk drive, a floppy disk drive, a tape drive, a Zip drive, a flash memory card, or a memory stick. Furthermore, the disk 906 can include optical drives like a CD-ROM, a CD recordable drive (CD-R drive), a CD rewriteable drive (CD-RW drive), or a digital video ROM drive (DVD ROM). The memory 904 can store processes 914 or data 916, for example. The disk 906 or memory 904 can store an operating system that controls and allocates resources of the machine 900.

The bus 908 can be a single internal bus interconnect architecture or other bus or mesh architectures. While a single bus is illustrated, it is to be appreciated that machine 900 may communicate with various devices, logics, and peripherals using other busses that are not illustrated (e.g., PCIE, SATA, Infiniband, 1394, USB, Ethernet). The bus 908 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 900 may interact with input/output devices via I/O Interfaces 918 and I/O Ports 910. Input/output devices can include, but are not limited to, a keyboard, a microphone, a pointing and selection device, cameras, video cards, displays, disk 906, network devices 920, and the like. The I/O Ports 910 can include but are not limited to, serial ports, parallel ports, and USB ports.

The machine 900 can operate in a network environment and thus may be connected to network devices 920 via the I/O Interfaces 918, or the I/O Ports 910. Through the network devices 920, the machine 900 may interact with a network. Through the network, the machine 900 may be logically connected to remote computers. The networks with which the machine 900 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 920 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C #, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. An item exchange locker station comprising:
   a station enclosure;
   a station entry door operably forming part of the station enclosure and configured to alternatively open and close to permit and impede, respectively, entry to the station enclosure;
   a station locking mechanism operably connected to the station enclosure and configured to alternatively lock and unlock to impede and permit, respectively, opening of the station entry door;
   a station-level user interface configured to be accessible from outside the station enclosure and to receive identifying information of a deliverer or a retriever seeking to enter the station and to transmit the identifying information to an off-site server remote from the exchange locker station for the identifying information to be validated against a database;
   a station-level controller operably coupled to the station locking mechanism and configured to receive station unlocking instructions from the off-site server upon validation of the identifying information;
   wherein the station locking mechanism is configured to unlock to permit opening of the station entry door for a limited amount of time upon receipt of the station unlocking instructions;
   a plurality of lockers disposed within the station enclosure, each of the lockers including:
      a locker access door configured to alternatively open and close to permit and impede, respectively, access to the locker's interior; and
      a locker locking mechanism configured to alternatively lock and unlock to impede and permit, respectively, opening of the locker access door;
      a locker-level controller configured to receive locker unlocking instructions from the off-site server upon validation of the identifying information; and
   wherein the locker locking mechanism is configured to unlock to permit opening of the locker access door upon receipt of the unlocking instructions.

2. The station of claim 1, comprising:
   a locker-level user interface configured to receive the identifying information of the deliverer or the retriever seeking to access the locker and to transmit the identifying information to the off-site server or a second off-site server for the identifying information to be validated against the database or a second database;

wherein the locker-level controller is configured to receive the locker unlocking instructions from the off-site server or the second off-site server upon validation of the identifying information.

3. The station of claim 1, comprising:
a locker-level user interface configured to receive the identifying information of the deliverer or the retriever seeking to access the locker and to transmit the identifying information to the off-site server or a second off-site server for the identifying information to be validated against the database or a second database;
wherein the locker-level controller is configured to receive the locker unlocking instructions from the off-site server or the second off-site server upon validation of the identifying information;
wherein the locker locking mechanism is configured to lock to impede opening of the locker access door after the locker access door has been closed; and
wherein the locker-level controller is configured to transmit information indicating that the locker locking mechanism has been locked.

4. The station of claim 1, wherein
the station locking mechanism is configured to lock to impede opening of the station entry door from outside the station after receipt of the station unlocking instructions or after detecting that the station entry door has been closed after receipt of the station unlocking instructions.

5. The station of claim 1, wherein
the station locking mechanism is configured to lock to impede opening of the station entry door from outside the station after receipt of the station unlocking instructions or after detecting that the station entry door has been closed after receipt of the station unlocking instructions,
the station-level controller is configured to transmit information indicating that the station locking mechanism has been locked.

6. The station of claim 1, wherein
the station locking mechanism is configured to lock to impede opening of the station entry door from outside the station after detecting that the station entry door has been closed after receipt of the locker unlocking instructions.

7. The station of claim 1, wherein
the station locking mechanism is configured to lock to impede opening of the station entry door from outside the station after detecting that the station entry door has been closed after receipt of the locker unlocking instructions,
the station-level controller is configured to transmit information indicating that the station locking mechanism has been locked.

8. The station of claim 1, wherein
each of the lockers includes a light visible from an area inside the station enclosure adjacent the entry door and the light lights up upon receipt of the station unlocking instructions for the light to identify a specific locker to which the deliverer is to deliver or from which the retriever is to retrieve.

9. The station of claim 1, comprising:
a plurality of light paths disposed on a floor or a ceiling of the station and configured for a light path from the plurality of light paths to light up upon receipt of the station unlocking instructions for the light path to guide the deliverer or retriever from the entry door to a specific locker to which the deliverer is to deliver or from which the retriever is to retrieve.

10. The station of claim 1, comprising:
a station lighting system configured to turn on upon receipt of the station unlocking instructions for the station lighting system to provide lighting inside the station.

11. A system including a plurality of stations including the station of claim 1, the system further comprising:
an off-site user interface configured to:
assign each user a unique ID to represent the user,
receive from the user order information including information regarding a desired station from the plurality of stations, information regarding a desired date/time for delivery or retrieval, and information regarding the deliverer or the retriever,
transmit to the deliverer delivery information regarding the station as a selected station from the plurality of stations, the locker as a selected locker within the station, and information regarding a selected date/time for delivery, and
transmit to the retriever retrieval information regarding the station as the selected station from the plurality of stations, the locker as the selected locker within the station, and information regarding a selected date/time for retrieval.

12. The system of claim 11, including the off-site server, wherein the off-site server is configured to transmit the station unlocking instructions only if:
the identifying information corresponds to the deliverer and is received from the selected station and at the selected date/time for delivery, or
the identifying information corresponds to the retriever and is received from the selected station and at the selected date/time for retrieval.

13. The system of claim 11, including the off-site server, wherein off-site server is configured to transmit the station unlocking instructions only if:
the identifying information corresponds to the deliverer and is received from the selected station and at the selected date/time for delivery, or
the identifying information corresponds to the retriever and is received from the selected station and at the selected date/time for retrieval,
wherein the selected date/time for delivery and the selected date/time for retrieval are at least 25 minutes apart.

14. The system of claim 11, including the off-site server, wherein off-site server is configured to transmit the station unlocking instructions only if:
the identifying information corresponds to the deliverer and is received from the selected station and at the selected date/time for delivery, or
the identifying information corresponds to the retriever and is received from the selected station and at the selected date/time for retrieval,
wherein the selected date/time for retrieval is set to a time at least 25 minutes after the station locking mechanism has been locked after station unlocking or locker unlocking instructions have been transmitted within the selected date/time for delivery.

15. The system of claim 11, wherein the off-site server is configured to, upon receipt of the identifying information, store the identifying information and the station, date, and time the identifying information was received.

16. The system of claim 11, including the off-site server, wherein the off-site user interface is configured to transmit to the deliverer a message notifying the deliverer that the selected date/time for delivery has begun.

17. The system of claim 11, including the off-site server, wherein the off-site user interface is configured to:
    transmit to the deliverer a message notifying that the selected date/time for delivery has begun, and
    transmit to the retriever a message notifying that the selected date/time for retrieval has begun.

18. The system of claim 11, including the off-site server, wherein the off-site user interface is configured to:
    transmit to the deliverer a message notifying that the selected date/time for delivery has begun, and
    transmit to the retriever a message notifying that the selected date/time for retrieval has begun,
    wherein the selected date/time for retrieval is set to a time at least 25 minutes after the station locking mechanism has been locked after station unlocking or locker unlocking instructions have been transmitted within the selected date/time for delivery.

19. A station comprising:
    a station enclosure;
    a station entry door operably forming part of the station enclosure and configured to alternatively open and close to permit and impede, respectively, entry to the station enclosure;
    a station locking mechanism operably connected to the station enclosure and configured to alternatively lock and unlock to impede and permit, respectively, opening of the station entry door;
    a station-level user interface configured to be accessible from outside the station enclosure and to receive identifying information of a deliverer or a retriever seeking to enter the station and to transmit the identifying information to an off-site server remote from the exchange locker station for the identifying information to be validated against a database;
    a station-level controller operably coupled to the station locking mechanism and configured to receive station unlocking instructions from the off-site server upon validation of the identifying information;
    wherein the station locking mechanism is configured to unlock to permit opening of the station entry door upon receipt of the station unlocking instructions; and
    a plurality of lockers disposed within the station enclosure, the lockers including:
        a locker access door configured to alternatively open and close to permit and impede, respectively, access to the locker's interior;
        a locker locking mechanism configured to alternatively lock and unlock to impede and permit, respectively, opening of the locker access door;
        a locker-level user interface configured to receive the identifying information of the deliverer or the retriever seeking to access the locker and to transmit the identifying information to the off-site server or a second off-site server for the identifying information to be validated against the database or a second database;
        a locker-level controller configured to receive locker unlocking instructions from the off-site server or the second off-site server upon validation of the identifying information; and
        wherein the locker locking mechanism is configured to unlock to permit opening of the locker access door for a limited amount of time upon receipt of the unlocking instructions.

20. A station comprising:
    a station enclosure;
    a station entry door operably forming part of the station enclosure and configured to alternatively open and close to permit and impede, respectively, entry to the station enclosure;
    a station locking mechanism operably connected to the station enclosure and configured to alternatively lock and unlock to impede and permit, respectively, opening of the station entry door;
    a station-level user interface configured to be accessible from outside the station enclosure and to receive identifying information of a deliverer or a retriever seeking to enter the station and to transmit the identifying information to an off-site server remote from the exchange locker station for the identifying information to be validated against a database;
    the station-level controller operably coupled to the station locking mechanism and configured to receive station unlocking instructions from the off-site server upon validation of the identifying information, wherein the station locking mechanism is configured to unlock to permit opening of the station entry door upon receipt of the station unlocking instructions;
    a plurality of lockers disposed within the station enclosure, the lockers including:
        a locker access door configured to alternatively open and close to permit and impede, respectively, access to a locker's interior; and
        a locker locking mechanism configured to alternatively lock and unlock to impede and permit, respectively, opening of the locker access door;
    a locker-level user interface configured to receive the identifying information of the deliverer or the retriever seeking to access a locker and to transmit the identifying information to the off-site server or a second off-site server for the identifying information to be validated against the database or a second database;
    a locker-level controller configured to receive locker unlocking instructions from the off-site server or the second off-site server upon validation of the identifying information;
    wherein the locker locking mechanism is configured to unlock to permit opening of the locker access door upon receipt of the unlocking instructions; and
    wherein the locker locking mechanism is configured to lock to impede opening of the locker access door after the locker access door has been closed.

* * * * *